(12) United States Patent
Schreiber

(10) Patent No.: US 12,456,500 B2
(45) Date of Patent: Oct. 28, 2025

(54) CONTROL OF DUAL-VOLTAGE MEMORY OPERATION

(71) Applicant: Advanced Micro Devices, Inc., Santa Clara, CA (US)

(72) Inventor: Russell Schreiber, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1044 days.

(21) Appl. No.: 16/820,828

(22) Filed: Mar. 17, 2020

(65) Prior Publication Data

US 2021/0035614 A1 Feb. 4, 2021

Related U.S. Application Data

(60) Provisional application No. 62/879,885, filed on Jul. 29, 2019.

(51) Int. Cl.
| | | |
|---|---|---|
| *G11C 11/41* | (2006.01) | |
| *G11C 5/14* | (2006.01) | |
| *G11C 11/412* | (2006.01) | |
| *G11C 11/418* | (2006.01) | |
| *G11C 11/419* | (2006.01) | |

(52) U.S. Cl.
CPC .............. *G11C 5/14* (2013.01); *G11C 11/412* (2013.01); *G11C 11/418* (2013.01); *G11C 11/419* (2013.01)

(58) Field of Classification Search
CPC ....... G11C 5/14; G11C 11/418; G11C 11/419; G11C 11/412; G11C 5/147
See application file for complete search history.

(56) References Cited

U.S. PATENT DOCUMENTS

| | | |
|---|---|---|
| 9,576,637 B1 | 2/2017 | Balakrishnan |
| 2009/0316498 A1* | 12/2009 | Chen ...................... G11C 5/147 365/189.09 |
| 2011/0205827 A1* | 8/2011 | Agata ................. H01L 23/5286 365/226 |
| 2018/0226111 A1 | 8/2018 | Schaefer et al. |
| 2021/0005248 A1* | 1/2021 | Verma ................... G11C 11/417 |

* cited by examiner

*Primary Examiner* — Mohammed A Bashar
(74) *Attorney, Agent, or Firm* — Polansky & Associates, P.L.L.C.; Paul J. Polansky

(57) ABSTRACT

An integrated circuit includes a memory and a system management unit. The memory has a memory array operating according to a memory power supply voltage and access circuitry coupled to said memory array operating according to a logic power supply voltage. The system management unit activates a first control signal to control an operation of the memory selectively in response to a magnitude of a difference in voltage between the logic power supply voltage and the memory power supply voltage.

20 Claims, 5 Drawing Sheets

CONTROL OF DUAL-VOLTAGE MEMORY OPERATION

This application claims priority to provisional application Ser. No. 62/879,885, filed Jul. 29, 2019, which is incorporated herein in its entirety.

BACKGROUND

Static random-access memories (SRAMs) are commonly used in digital integrated circuits and in particular in microprocessors. SRAMs can be used for tag or data storage in caches associated with a central processing unit (CPU) core or graphics processing unit (GPU) core. For example, a multi-core processor chip can have a level one ("L1") cache associated with each processor core, and level 2 ("L2") and level 3 ("L3") caches that are shared between multiple processor cores.

Modern microprocessors operate at relatively low voltages for some workloads to save power, and at relatively high voltages to support higher clock speeds for other workloads. To operate embedded memory arrays such as SRAM arrays at low voltages, modern microprocessors often implement a write assist technique using a common method that enhances writability called negative bit line boost. However, if the SRAM array operates at too high of a voltage, the voltage across transistors in the bit cells connected to each column multiplexed bit line pair may cause reliability issues such as time-dependent dielectric breakdown, hot carrier injection, negative bias temperature instability, positive bias temperature instability, etc.

This problem is especially difficult in systems that use one voltage for the operation of the memory cells of the memory array and another voltage, for example the microprocessor's operating voltage, for the memory access circuitry.

Figure 1:
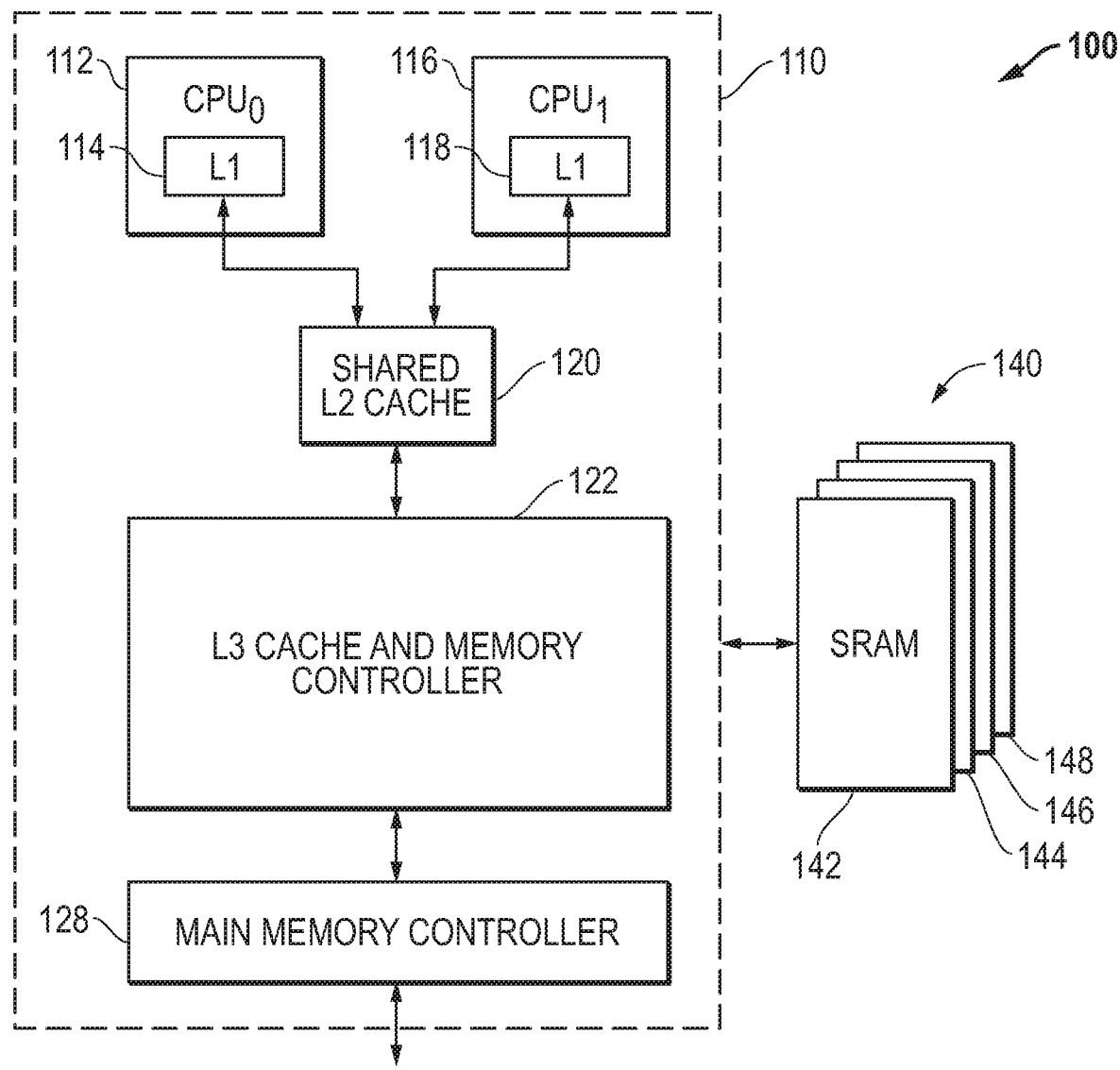
FIG. 1 illustrates in block diagram form a data processing system having a multi-chip memory system known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

An integrated circuit includes a memory and a system management unit. The memory has a memory array operating according to a memory power supply voltage and access circuitry coupled to the memory array operating according to a logic power supply voltage. The system management unit activates a first control signal to control an operation of the memory selectively in response to a magnitude of a difference in voltage between the logic power supply voltage and the memory power supply voltage.

A microprocessor includes a central processing unit and a system management unit. The central processing unit processes stored program instructions and is capable of operating in a plurality of power states, in which each power state corresponds to a frequency and a logic power supply voltage such that the central processing unit selectively operates in a range from a low value of the logic power supply voltage to a high value of the logic power supply voltage according to a selected power state. The central processing unit includes a first memory having a memory array operating according to a first memory power supply voltage and first access circuitry coupled to the memory array operating according to the logic power supply voltage. The system management unit is coupled to the central processing unit and activates a first control signal to control an operation of the first memory selectively in response to determining a magnitude of a difference in voltage between the logic power supply voltage and the first memory power supply voltage.

A method for operating an integrated circuit having a memory array operating according to a memory power supply voltage and access circuitry coupled to the memory array operating according to a logic power supply includes setting a value of the memory power supply voltage to a predetermined level. A value of the logic power supply voltage is changed dynamically according to an operating condition of the integrated circuit. A difference in voltage between the logic power supply voltage and the memory power supply voltage is determined. The memory is selectively operated in a first manner when the difference exceeds a first threshold, and in a second manner otherwise.

FIG. 1 illustrates in block diagram form a data processing system 100 having a multi-chip memory system known in the prior art. Data processing system 100 includes generally a microprocessor 110 and a static random-access memory ("SRAM") memory system 140. In the example shown in FIG. 1, microprocessor 110 is a single-chip multi-core processor that includes a first central processing unit (CPU) core 112 labeled "CPU$_0$", a second CPU core 116 labeled "CPU$_1$", a shared L2 cache 120, an L3 cache and memory controller 122, and a main memory controller 128. CPU core 112 includes an L1 cache 114 and CPU core 116 includes an L1 cache 118. SRAM memory system 140 generally includes low power, high-speed operation SRAM dies, including an SRAM die 142, an SRAM die 144, an SRAM die 146, and an SRAM die 148. Microprocessor 110 could be replaced with other types of data processors including accelerated processing units (APUs), digital signal processors (DSPs), single-core processors, etc.

CPU core 112 has a bidirectional port connected to a first bidirectional port of shared L2 cache 120 over a bidirectional bus. CPU core 116 has a bidirectional port connected to a second bidirectional port of shared L2 cache 120 over a bidirectional bus. Shared L2 cache 120 has a third bidirectional port connected to a first bidirectional port of L3 cache and memory controller 122 over a bidirectional bus. L3 cache and memory controller 122 has a second bidirectional port connected to a bidirectional port of SRAM memory system 140 over a bidirectional bus and a third bidirectional port connected to a first bidirectional port of main memory controller 128 over a bidirectional bus. Main memory controller 128 has a second bidirectional port connected to main memory over a bidirectional bus.

SRAM memory system 140 is a high bandwidth memory system that provides data and tag storage for fast cache accesses of the L3 cache. In the example illustrated in FIG. 1, SRAM memory system 140 includes four separate dies.

According to various embodiments disclosed herein, dual-rail SRAMs are reconfigured by a system management unit (or other circuits such as a voltage comparator circuit) based on programmable thresholds of a difference between two power supply voltages, labeled "$V_{DD}$" and "$V_{DDM}$". $V_{DD}$ is a supply voltage for logic circuitry and is dynamically changing based on, for example, power states used in dynamic voltage and frequency scaling (DVFS). $V_{DDM}$ is a static power supply voltage that is used to power memory bit cells.

Dual voltage supply SRAMs present challenges in pushing how far apart in voltage the supplies can be while maintaining proper operation. Oftentimes assist features are needed to compensate for these differences, but an assist feature that is needed when $V_{DD} \gg V_{DDM}$ may lead to design failure when $V_{DDM} \gg V_{DD}$, and vise versa. One example of an assist feature is word line underdrive that may be used when $V_{DDM} \ll V_{DD}$ to maintain bit cell stability. However, this assist feature may lead to writability problems when $V_{DD} \ll V_{DDM}$. Another example of an assist feature is the use of negative bit line (BL) that is useful except when $V_{DD} \gg V_{DDM}$ because this assist feature could lead to overvoltage when $V_{DD}$ is very high so a mechanism is needed to de-assert negative BL when $V_{DD} \gg V_{DDM}$.

An integrated circuit according to various embodiments disclosed herein provides a mechanism to reconfigure assist features used in on-chip memory blocks such as the SRAMs as $V_{DD}$ is raised/lowered past certain thresholds. In particular, it determines the difference between the supplies to enable or disable certain DRAM assist features. Specifically, when $V_{DD}-V_{DDM}$ is greater than a first threshold, a system management unit asserts a control signal known as "SUPERVMAXEN" that can be used to enable or disable certain SRAM assist features. When $V_{DDM}-V_{DD}$ is greater than a second threshold, the system management unit asserts a signal known as "SUPERVMIN" that can be used to enable or disable other SRAM assist features. According to some embodiments, which SRAM assist features are enabled or disabled in any of these relative voltage ranges is fuse-programmable, as well as the thresholds for when these assists are enabled or disabled.

In general, dual-rail SRAM designs will only operate properly across a voltage range naturally supported by the technology, without assist or with assist. Known integrated circuits with SRAMs have enabled or disabled assist features on single rail SRAMs based on the absolute level of $V_{DD}$.

According to embodiments disclosed herein, the integrated circuit (for example through a system management unit) enables or disables assist features based on the difference between $V_{DD}$ and $V_{DDM}$, and thus maintains proper operation even when the voltages are far apart.

Fuses can also be used to set to threshold levels, labeled "SUPERVMAXTH" and "SUPERVMINTH", that determine whether to enable and/or disable assist features. Other fuses define program bits called "PROG" bits that can be used to determine what happens when SUPERVMIN is asserted and/or SUPERVMAX is asserted.

Figure 2:
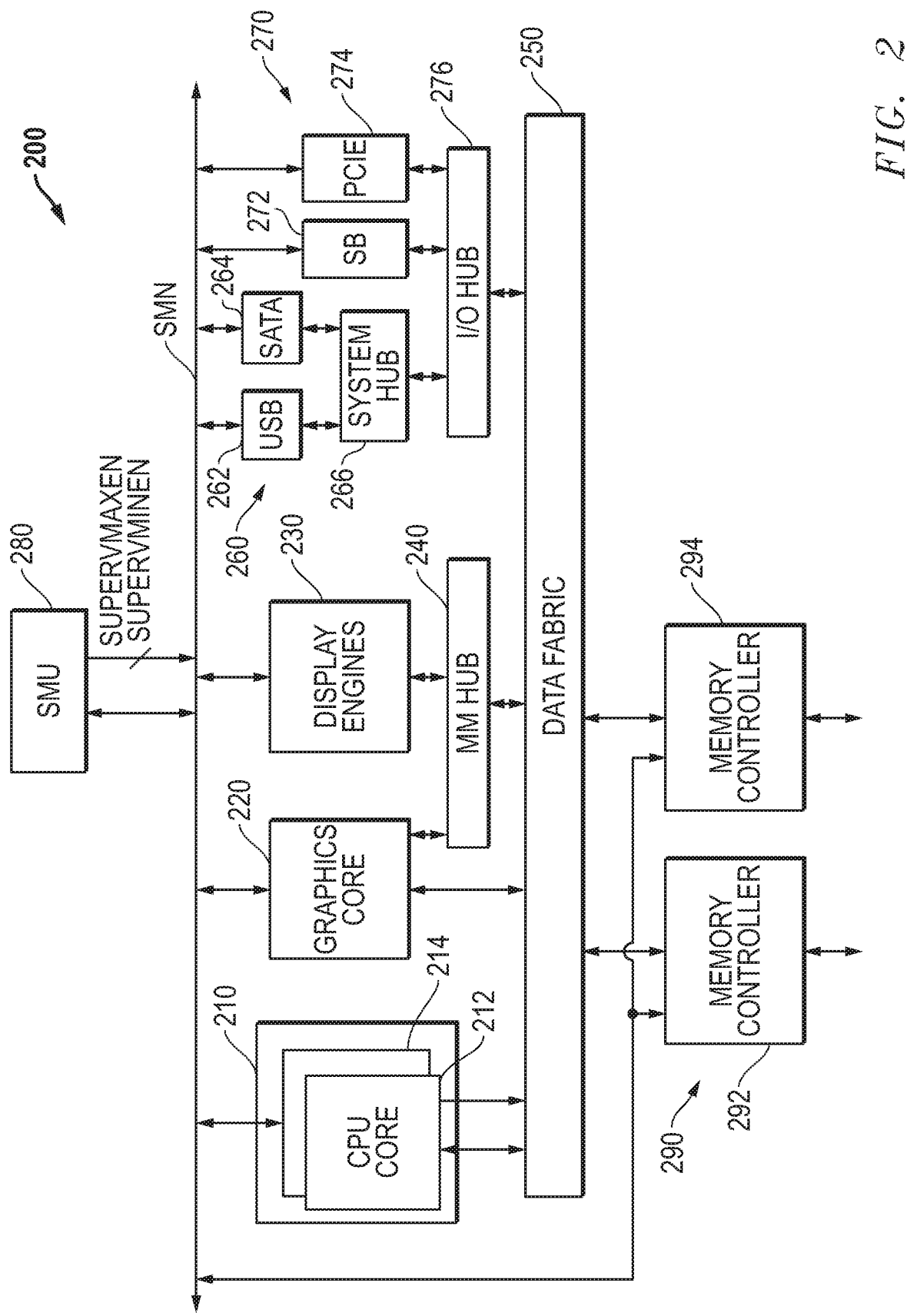
FIG. 2 illustrates in block diagram form an integrated circuit according to some embodiments.

FIG. 2 illustrates in block diagram form an integrated circuit 200 in the form of an accelerated processing unit (APU) according to some embodiments. Integrated circuit 200 includes generally a central processing unit (CPU) core complex 210, a graphics core 220, a set of display engines 230, a memory management hub 240, a data fabric 250, a set of peripheral controllers 260, a set of peripheral bus controllers 270, a system management unit (SMU) 280, and a set of memory controllers 290.

CPU core complex 210 includes a CPU core 212 and a CPU core 214. In this example, CPU core complex 210 includes two CPU cores, but in other embodiments CPU core complex can include an arbitrary number of CPU cores. Each of CPU cores 212 and 214 is bidirectionally connected to a system management network (SMN), which forms a control fabric, and to data fabric 250, and is capable of providing memory access requests to data fabric 250. Each of CPU cores 212 and 214 may be unitary cores, or may further be a core complex with two or more unitary cores sharing certain resources such as caches. In the exemplary embodiment, CPU core complex 210 includes three levels of cache with on-chip SRAMs for tag and data storage instead of the off-chip L3 tag and data storage in data processing system 100 of FIG. 1.

Graphics core 220 is a high-performance graphics processing unit (GPU) capable of performing graphics operations such as vertex processing, fragment processing, shading, texture blending, and the like in a highly integrated and parallel fashion. Graphics core 220 is bidirectionally connected to the SMN and to data fabric 250, and is capable of providing memory access requests to data fabric 250. In this regard, integrated circuit 200 may either support a unified memory architecture in which CPU core complex 210 and graphics core 220 share the same memory space, or a memory architecture in which CPU core complex 210 and graphics core 220 share a portion of the memory space, while graphics core 220 also uses a private graphics memory not accessible by CPU core complex 210.

Display engines 230 render and rasterize objects generated by graphics core 220 for display on a monitor. Graphics core 220 and display engines 230 are bidirectionally connected to a common memory management hub 240 for uniform translation into appropriate addresses in the memory system, and memory management hub 240 is bidirectionally connected to data fabric 250 for generating such memory accesses and receiving read data returned from the memory system.

Data fabric 250 includes a crossbar switch for routing memory access requests and memory responses between any memory accessing agent and memory controllers 290. It also includes a system memory map, defined by BIOS, for determining destinations of memory accesses based on the system configuration, as well as buffers for each virtual connection.

Peripheral controllers 260 include a USB controller 262 and a SATA interface controller 264, each of which is bidirectionally connected to a system hub 266 and to the SMN bus. These two controllers are merely exemplary of peripheral controllers that may be used in integrated circuit 200.

Peripheral bus controllers 270 include a system controller or "Southbridge" (SB) 272 and a PCIe controller 274, each of which is bidirectionally connected to an input/output (I/O) hub 276 and to the SMN bus. I/O hub 276 is also bidirectionally connected to system hub 266 and to data fabric 250. Thus for example a CPU core can program registers in USB controller 262, SATA interface controller 264, SB 272, or PCIe controller 274 through accesses that data fabric 250 routes through I/O hub 276.

SMU 280 is a local controller that controls the operation of the resources on integrated circuit 200 and synchronizes communication among them. SMU 280 manages power-up sequencing of the various processors on integrated circuit 200 and controls multiple off-chip devices via reset, enable and other signals. SMU 280 includes one or more clock sources not shown in FIG. 2, such as a phase locked loop (PLL), to provide clock signals for each of the components of integrated circuit 200. SMU 280 also manages power for the various processors and other functional blocks, and may receive measured power consumption values from CPU cores 212 and 214 and graphics core 220 to determine appropriate power states.

Integrated circuit 200 also implements various system monitoring and power saving functions. In particular one system monitoring function is thermal monitoring. For example, if integrated circuit 200 becomes hot, then SMU 280 can reduce the frequency and voltage of CPU cores 212 and 214 and/or graphics core 220. If integrated circuit 200 becomes too hot, then it can be shut down entirely. Thermal events can also be received from external sensors by SMU 280 via the SMN bus, and SMU 280 can reduce the clock frequency and/or power supply voltage in response.

As shown in FIG. 2, SMU 280 measures the difference between $V_{DD}$ and $V_{DDM}$, activates SUPERVMINEN if $V_{DDM}-V_{DD}>$SUPERVMINTH, and activates SUPERVMAXEN if $V_{DD}-V_{DDM}>$SUPERVMAXTH. SMU 280 distributes these control signals over the SMN bus to various components of the integrated circuit that will use this information, such as an SRAM block in a cache associated with a CPU core.

According to some embodiments, a set of fuse-selectable bits, known as program or "PROG" bits, are then logically combined with SUPERVMAXEN and SUPERVMINEN signals to determine which conditions will affect the enablement and disablement of an assist feature used in that block. This programmability allows the individual blocks to select both whether they will act upon the activation of SUPERVMAXEN and SUPERVMINEN, and if so, what action will be taken. It allows the individual blocks to tailor their specific operation under these conditions for their specific needs.

Figure 3:
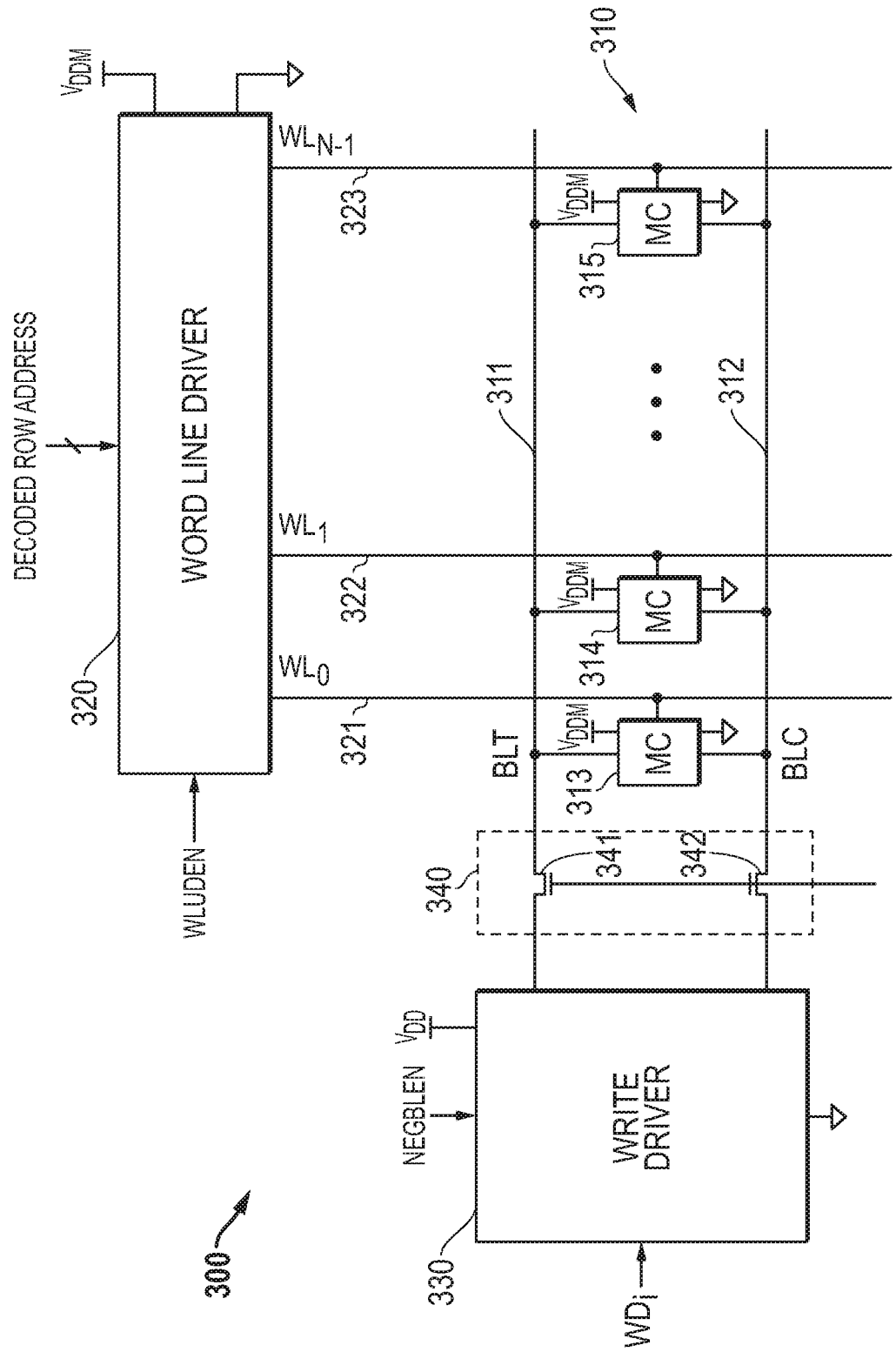
FIG. 3 illustrates in partial block diagram and partial schematic form a portion of a memory that can be used in the microprocessor of FIG. 2.

FIG. 3 illustrates in partial block diagram and partial schematic form a portion of a memory 300 that can be used in integrated circuit 200 of FIG. 2. Memory 300 includes generally a memory cell array 310, a word line driver 320, a write driver 330, and a set of column select switches 340. Other conventional elements of SRAMs not relevant to the present discussion such as read column selection logic, sense amplifiers, etc. are present but omitted from FIG. 3 for ease of discussion.

Memory cell array 310 includes an array of memory cells located at intersections of word lines forming the row direction and bit line pairs forming the column direction. Shown in FIG. 3 is an exemplary column of memory cells connected to a bit line pair having a bit line 311 labeled "BLT" (bit line true), a bit line 312 labeled "BLC" (bit line complement), and exemplary memory cells 313, 314, and 315. Each of memory cells 313, 314, and 315 is an SRAM bit cell having a first terminal connected to bit line 311, a second terminal connected to bit line 312, a control terminal connected to a respective one of word line signals labeled "$WL_0$", "$WL_1$", and "$WL_2$", respectively, a positive power supply terminal receiving $V_{DDM}$, and a negative power supply terminal connected to ground.

Word line driver 320 has an input terminal for receiving a multi-bit signal labeled "DECODED ROW ADDRESS", a control input for receiving a word line under-drive control signal labeled "WLUDEN", a set of output terminals connected to a corresponding set of word lines conducting word line signals $WL_0$, $WL_1$, and $WL_2$, a positive power supply terminal for receiving $V_{DDM}$, and a negative power supply terminal connected to ground.

Write driver 330 has an input terminal for receiving a write data signal labeled "$WD_i$", a control input for receiving a negative bit line control signal labeled "NEGBLEN", a first output terminal, a second output terminal, a positive power supply terminal receiving $V_{DD}$, and a negative power supply terminal connected to ground.

Column select switches 340 include transistors 341 and 342. Transistor 341 is an N-channel metal-oxide-semiconductor (MOS) transistor having a first source/drain terminal connected to the first output of write driver 330, a gate for receiving a column enable signal, and a second source/drain terminal connected to positive bit line 311. Transistor 342 is an N-channel MOS transistor having a first source/drain terminal connected to the first output of write driver 330, a gate for receiving a column enable signal, and a second source/drain terminal connected to negative bit line 312. Column select switches 340 are used to multiplex the write data signals from write driver 330 onto bit lines 311 and 312 and memory 300 has other column select switches that multiplex the write data signals onto one or more other bit line pairs, but these are not shown in FIG. 3 for each of illustration.

In operation, memory 300 performs normal SRAM memory access operations including row- and column-selection, reading through a read path not shown in FIG. 3, and writing through a write path including write driver 330. During an access, memory 300 receives a row and column address. A row decoder (not shown in FIG. 3) selects one row of memory 300 by decoding the row address signal into the multi-bit DECODED ROW ADDRESS with only one active output. Word line driver 320 in turn drives the word line corresponding to the selected row to a voltage sufficient to select a memory cell, but not so high as to cause damage to the selected memory cell, while keeping other word lines inactive. It does so by driving the word line on the selected row selectively to $V_{DDM}$ or to a lower voltage, as follows. Word line driver 320 is in the $V_{DDM}$ domain. It has a control input for receiving the WLUDEN signal that, when active, causes word line driver 320 to reduce the voltage on the active word line driven to the memory cell in the selected columns. WLUDEN can be activated, for example, when $V_{DDM}-V_{DD}>$SUPERVMINTH to prevent a large differential voltage between the selected word line and the activated bit line during a write cycle from damaging an access transistor in the selected memory cell.

Column selection is done through a column decoder (not shown in FIG. 3) that selectively activates column select signals of specified columns. The output of the decoded column select signal is ANDed with the operation type signal, either read or write, to activate the appropriate data path. During a write cycle when the column decoder selects column i, the column select write signal is active and makes transistors 341 and 342 conductive. Making transistors 314 and 342 conductive allows write driver to drive bit lines 311 and 312 in opposite logic states according to write data signal $WD_i$ into the selected memory cell. Write driver 330 is in the $V_{DD}$ domain. It has a control input for receiving the NEGBLEN signal that, when active, causes write driver 330 to drive the voltage on the negative bit line of the bit line pair below ground to provide a higher differential voltage across the bit line pair. NEGBLEN can be activated, for example, when $V_{DD}-V_{DDM}$>SUPERVMAXTH because otherwise the memory cell contents may not be able to be successfully overwritten.

Figure 4:
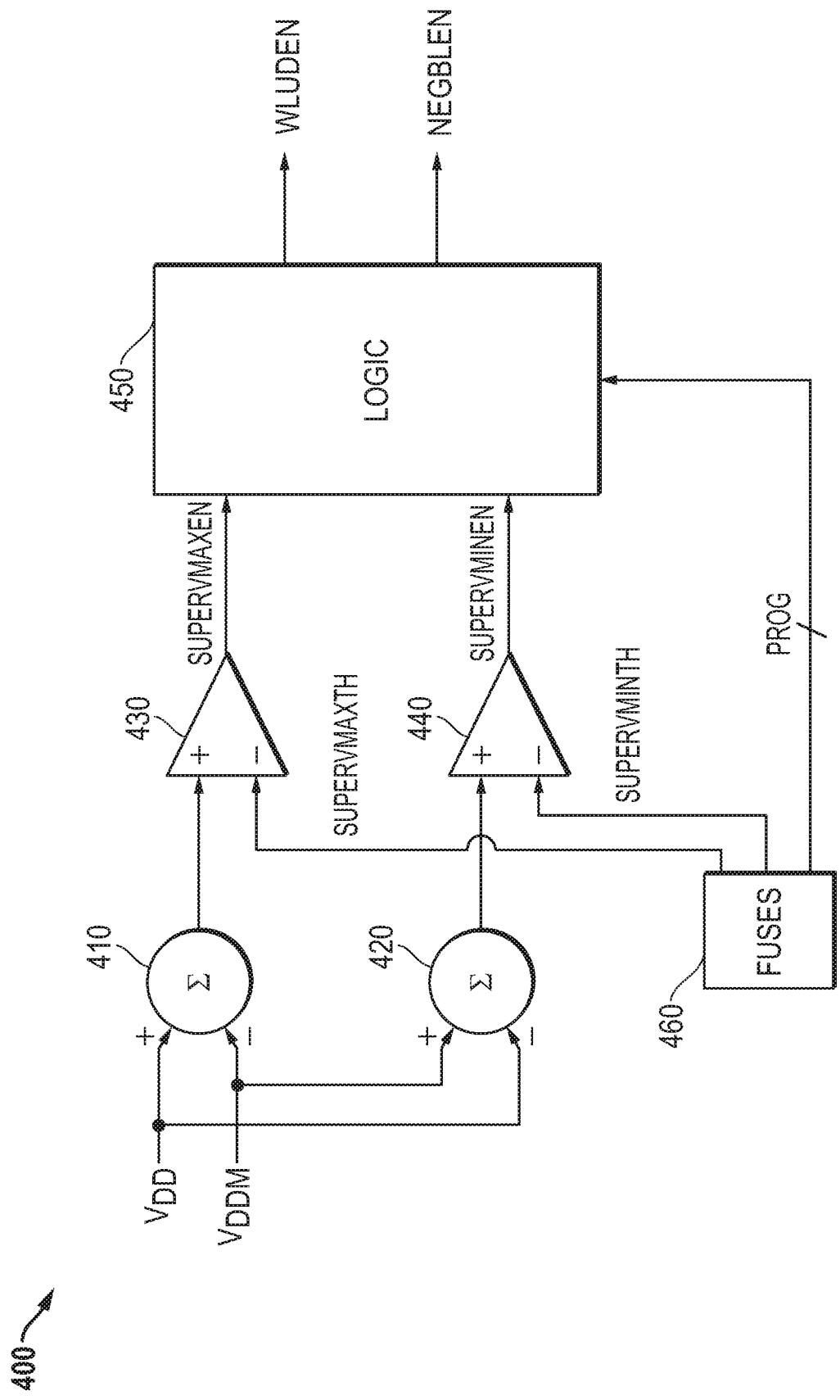
FIG. 4 illustrates in block diagram form a control circuit that can be used to generate the control signals used in the memory of FIG. 3 according to some embodiments.

FIG. 4 illustrates in block diagram form a control circuit 400 that can be used to generate the control signals used in memory 300 of FIG. 3 according to some embodiments. Control circuit 400 includes summing devices 410 and 420, comparators 430 and 440, a logic circuit 450, and a fuse block 460. Summing device 410 has a positive input for receiving $V_{DD}$, a negative input for receiving $V_{DDM}$, and an output. Summing device 420 has a positive input for receiving $V_{DDM}$, a negative input for receiving $V_{DD}$, and an output. Comparator 430 has a positive input connected to the output of summing device 410, a negative input for receiving SUPERVMAXTH, and an output for providing SUPERVMAXEN. Comparator 440 has a positive input connected to the output of summing device 420, a negative input for receiving SUPERVMINTH, and an output for providing SUPERVMINEN. Logic circuit 450 has a first input for receiving the SUPERVMAXEN signal, a second input for receiving the SUPERVMINEN signal, a third input for receiving a signal labeled "PROG", a first output for providing the WLUDEN signal, and a second output for providing the NEGBLEN signal. Fuse block 460 include a set of fuses that together provide the SUPERVMAXTH, SUPERVMINTH, and multi-bit PROG signals.

In operation, summing device 410 determines the difference in voltage between $V_{DD}$ and $V_{DDM}$, namely $V_{DD}-V_{DDM}$. Comparator 430 determines whether this difference is greater than SUPERVMAXTH, and provides SUPERVMAXEN at a logic high if $V_{DD}-V_{DDM}$>SUPERVMAXTH, and at a logic low otherwise. Summing device 420 determines the difference in voltage between $V_{DDM}$ and $V_{DD}$, namely $V_{DDM}-V_{DD}$. Comparator 440 determines whether this difference is greater than SUPERVMINTH, and provides SUPERVMINEN at a logic high if $V_{DDM}-V_{DD}$>SUPERVMAXTH, and at a logic low otherwise.

Fuse block 460 has a set of fuses that determine the logic states of corresponding bits of the multi-bit PROG signal, and that determine the action taken by a particular circuit in response to the activation of SUPERVMAXEN and SUPERVMINEN. As shown in the example of FIG. 4 and explained above, the actions include word line underdrive which is enabled when SUPERVMAXEN is active at a logic high voltage, and is disabled otherwise. Negative bit line drive is enabled when is inactive at a logic low voltage. Fuse block 460 may include, for example, the fuse bits and associated circuitry used to generate the logic signals such as digital buffers.

Logic circuit 450 is responsive to the PROG bits generated by fuse block 460. In some embodiments, the PROG bits include two bits generated from two fuses, one that determines whether or not WLUDEN is activated in response to the activation of SUPERVMINEN, and another one that determines whether or not NEGBELN is activated in response to the inactivation of SUPERVMAXEN. In the illustrated embodiment in which fuses in fuse block 460 determine the values of SUPERVMAXTH and SUPERVMINTH, additional circuitry not shown in FIG. 4 would convert the digital values into corresponding analog voltages.

In an actual microprocessor, control circuit 400 can be advantageously distributed among the various blocks. For example, SMU 280 is a centralized block that controls the operating voltages on integrated circuit 200, and since there is a common memory power supply voltage $V_{DDM}$, it generates SUPERVMAXEN and SUPERVMINEN and drives them across the chip. Thereafter, each block that is responsive to SUPERVMAXEN and SUPERVMINEN can generate control signals such as WLUDEN and NEGBLEN to control the assist operation of a local memory. This flexibility allows these signals to be independently generated because the various blocks, such as a relatively small L1 cache and a relatively large L3 cache, may need to respond differently.

In some embodiments, SMU 280 is also responsible for changing $V_{DD}$ voltage levels during operation according to the P-state, while the $V_{DDM}$ voltage level provided to the SRAM bit cells is static. In this case, SMU 280 checks $V_{DD}$ levels against the fuse-programmed thresholds when doing voltage changes such that when raising $V_{DD}$ past the SUPERVMAXTH, the SMU raises $V_{DD}$ until $V_{DD}-V_{DDM}$=SUPERVMAXTH at which point it asserts SUPERVMAXEN, but then pauses for a predetermined amount of time to allow the new level of $V_{DD}$ to be distributed throughout the SRAM before continuing to raise $V_{DD}$ past the threshold. Moreover, when reducing $V_{DD}$, the SMU reduces $V_{DD}$ until $V_{DDM}-V_{DD}$=SUPERVMINTH, at which point it asserts SUPERVMINEN but pauses for the predetermined amount of time for the new level of $V_{DD}$ to be distributed throughout the SRAM before continuing to lower $V_{DD}$ past the threshold. A further explanation of the sequence of these transitions will now be given.

Figure 5:
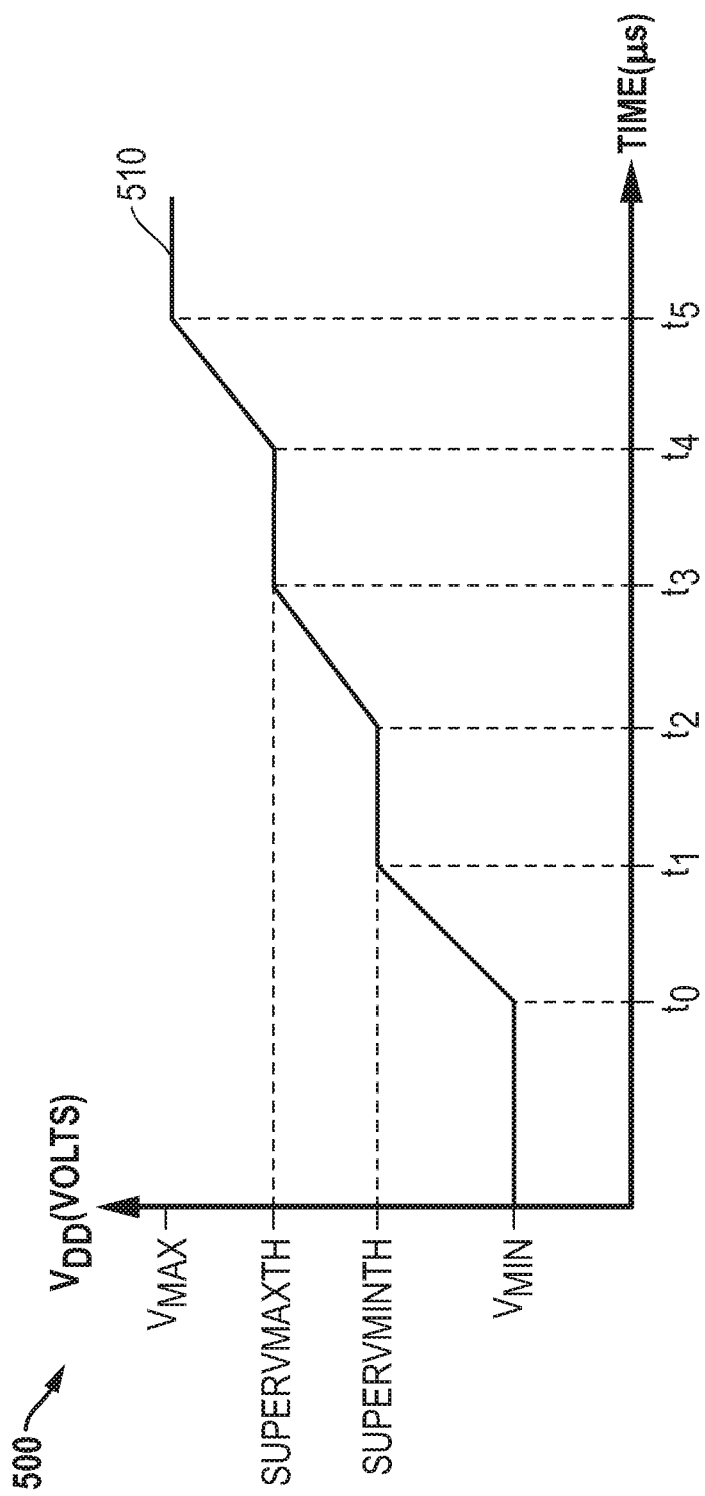
FIG. 5 shows a graph of the operation of the system management unit of FIG. 2 during a power supply voltage change according to some embodiments.

FIG. 5 shows a graph 500 of the operation of SMU 280 of FIG. 2 during a power supply voltage change according to some embodiments. In FIG. 5, the horizontal axis represents time in microseconds (μs), and the vertical axis represents the logic power supply voltage $V_{DD}$ in volts. Along the horizontal axis, graph 500 shows six time points of interest, labeled "$t_0$", "$t_1$", "$t_2$", "$t_3$", "$t_4$", and "$t_5$". Graph 500 includes a waveform 510 showing how SMU 280 changes $V_{DD}$ from a minimum voltage labeled "$V_{MIN}$" to a maximum voltage labeled "$V_{MAX}$" corresponding to, for example, a transition from a lowest P-state to a highest P-state.

Integrated circuit 200 starts with $V_{DD}=V_{MIN}$, and with SUPERVMINEN asserted. First, SMU 280 raises $V_{DD}$ until $V_{DDM}-V_{DD}$=SUPERVMINTH at time $t_1$, and de-asserts SUPERVMINEN. SMU 280 pauses the increase in $V_{DD}$ between time $t_1$ and time $t_2$ to ensure all SRAMs are configured with SUPERVMINEN de-asserted. Between time $t_1$ and time $t_2$, SMU 280 resumes raising $V_{DD}$ until $V_{DD}-V_{DDM}$=SUPERVMAXTH at time $t_3$, and it asserts SUPERVMAXEN. SMU 280 pauses the increase in $V_{DD}$ between time $t_3$ and time $t_4$ to ensure all SRAMs are configured with SUPERVMAXEN asserted. Between time $t_4$ and time $t_5$, SMU 280 resumes raising $V_{DD}$ until $V_{DD}=V_{MAX}$. After time $t_5$, SMU 280 keeps $V_{DD}$ stable at $V_{MAX}$ until the next power supply transition.

Based on the PROG bits set in fuse block 460, the various memory blocks will respond to SUPERVMAXEN and SUPERVIMEN by enabling or disabling certain assist features. These assist features include but are not limited to word line underdrive, negative bit line write driver, and word line boost.

Thus an integrated circuit with a memory block using the techniques described herein has several advantages over known designs. First, by changing the operation of the memory array selectively based on the difference between the power supply voltage applied to the memory array ($V_{DDM}$) and the variable power supply voltage used by the access circuitry ($V_{DD}$), integrated circuit 200 provides greater flexibility compared to a design that uses the value of a single voltage to determine the operation. Moreover, it allows a power supply voltage, such as the memory voltage $V_{DDM}$, to be set after integrated circuits are manufactured and the response of the memory changed appropriately.

Second, by selectively determining the actions to be taken in response to significant differences between the memory voltage and the logic voltage, integrated circuit 200 allows fine-tuning after design after the operation of the manufactured integrated circuit can be fully characterized.

Third, by using a system of fuses that determine the specific actions of local circuits, the integrated circuit can vary the actions according to the needs of different memory circuits.

Integrated circuit 200 of FIG. 2 or any portion thereof may be described or represented by a computer accessible data structure in the form of a database or other data structure which can be read by a program and used, directly or indirectly, to fabricate integrated circuits. For example, this data structure may be a behavioral-level description or a register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the assist actions include word line underdrive, negative bit line boost, and word line boost, but it should be apparent that these are just examples of appropriate assist actions. In the illustrated embodiment, the integrated circuit included a chip-wide system management unit with local fuses and a local logic circuit. However, these components could be distributed differently across the integrated circuit. In embodiments in which the fuse block generates the threshold voltages, the control circuit can generate the threshold voltages from the digital program signals using a variety of different analog-to-digital conversion circuits. Moreover, the disclosed techniques can be used in a variety of different types of integrated circuits that includes but it not limited to microprocessors.

Accordingly, it is intended by the appended claims to cover all modifications of the disclosed embodiments that fall within the scope of the disclosed embodiments.

What is claimed is:

1. An integrated circuit comprising:
a memory having a memory array operating according to a memory power supply voltage and access circuitry coupled to said memory array operating according to a logic power supply voltage; and
a system management unit for activating a first control signal to selectively enable an assist feature of said memory selectively in response to a magnitude of a difference in voltage between said logic power supply voltage and said memory power supply voltage.

2. The integrated circuit of claim 1, wherein:
said system management unit further activates said first control signal to control an operation of said memory selectively in response to at least one program bit.

3. The integrated circuit of claim 2, wherein:
said system management unit activates said first control signal when a difference between said logic power supply voltage and said memory power supply voltage is greater than a first threshold and said at least one program bit indicates a first state; and
said system management unit keeps said first control signal inactive when a difference between said logic power supply voltage and said memory power supply voltage is greater than said first threshold and said at least one program bit indicates a second state.

4. The integrated circuit of claim 2, wherein:
said system management unit further comprises at least one fuse for storing a corresponding one of said at least one program bit.

5. The integrated circuit of claim 1, wherein said memory comprises:
a word line driver coupled to said memory array and having a control input for receiving said first control signal, wherein said assist feature comprises said word line driver activating a selected word line using a voltage less than said memory power supply voltage in response to an activation of said first control signal,
wherein said system management unit activates said first control signal if a difference between said logic power supply voltage and said memory power supply voltage exceeds a first threshold and at least one program bit is in a first state.

6. The integrated circuit of claim 5, wherein said memory comprises:
a write driver coupled to said memory array and having a control input for receiving a second control signal to selectively enable a second assist feature, wherein said second assist feature comprises write driver drives a predetermined voltage to bit line of a selected bit line pair using a voltage less than a ground voltage in response to an activation of said second control signal,
wherein said system management unit activates said second control signal if a difference between said memory power supply voltage and said logic power supply voltage exceeds a second threshold and said at least one program bit is in a second state.

7. The integrated circuit of claim 1, wherein said memory comprises:
a write driver coupled to said memory array and having a control input for receiving said first control signal, wherein said assist feature comprises said write driver driving a predetermined voltage to bit line of a selected bit line pair using a voltage less than a ground voltage in response to an activation of said first control signal,
wherein said system management unit selectively activates said first control signal when a difference between said memory power supply voltage and said logic power supply voltage exceeds a first threshold.

8. A microprocessor comprising:
a central processing unit for processing stored program instructions and capable of operating in a plurality of power states, in which each power state corresponds to a frequency and a logic power supply voltage such that said central processing unit selectively operates in a range from a low value of said logic power supply voltage to a high value of said logic power supply voltage according to a selected power state, wherein said central processing unit comprises:
- a first memory having a memory array operating according to a first memory power supply voltage and first access circuitry coupled to said memory array operating according to said logic power supply voltage; and
- a system management unit coupled to said central processing unit for activating a first control signal to selectively enable an assist feature of said first memory selectively in response to determining a magnitude of a difference in voltage between said logic power supply voltage and said first memory power supply voltage.

9. The microprocessor of claim 8, wherein:
said system management unit further activates said first control signal to enable said assist feature of said first memory selectively in response to at least one program bit.

10. The microprocessor of claim 9, wherein:
said system management unit activates said first control signal when a difference between said logic power supply voltage and said first memory power supply voltage is greater than a first threshold and said at least one program bit indicates a first state; and
said system management unit keeps said first control signal inactive when a difference between said logic power supply voltage and said first memory power supply voltage is greater than said first threshold and said at least one program bit indicates a second state.

11. The microprocessor of claim 10, wherein:
during a power state transition in which said logic power supply voltage increases to cause said difference in voltage between said logic power supply voltage and said first memory power supply voltage to exceed said first threshold, said system management unit halts an increase in said logic power supply voltage for a predetermined time.

12. The microprocessor of claim 9, wherein:
said system management unit further comprises at least one fuse for storing a corresponding one of said at least one program bit.

13. The microprocessor of claim 8, wherein said first memory stores data of a cache.

14. The microprocessor of claim 8, wherein:
said system management unit activates said first control signal when said difference in voltage between said logic power supply voltage and said first memory power supply voltage is greater than a first threshold, and keeps said first control signal inactive otherwise.

15. A method for operating an integrated circuit having a memory having a memory array operating according to a memory power supply voltage and access circuitry coupled to said memory array operating according to a logic power supply voltage, comprising:
setting a value of said memory power supply voltage to a predetermined level;
changing a value of said logic power supply voltage dynamically according to an operating condition of the integrated circuit;
determining a difference in voltage between said logic power supply voltage and said memory power supply voltage; and
selectively enabling an assist feature of said memory in a first manner when said difference exceeds a first threshold, and in a second manner otherwise.

16. The method of claim 15, wherein said selectively enabling said assist feature comprises:
operating said memory in said first manner when said difference exceeds a first threshold in response to a first state of at least one program bit; and
operating said memory in said second manner regardless of whether said difference exceeds said first threshold in response to a second state of said at least one program bit.

17. The method of claim 15, wherein:
setting said value of said memory power supply voltage to said predetermined level comprises setting said value based on specified manufacturing process characteristics of the integrated circuit.

18. The method of claim 15, wherein:
setting said value of said memory power supply voltage to said predetermined level comprises setting said value based on a state of at least one fuse.

19. The method of claim 15, wherein:
said first manner comprises underdriving a selected word line to a level below said logic power supply voltage; and
said second manner comprises driving said selected word line to a level substantially equal to said logic power supply voltage.

20. The method of claim 15, wherein:
said first manner comprises driving a negative bit line of a selected bit line pair to a voltage below a ground voltage during a write cycle; and
said second manner comprises driving said negative bit line of said selected bit line pair to a voltage substantially equal to said ground voltage during said write cycle.

* * * * *